April 13, 1943.   T. H. BIRCH   2,316,217
SINGLE CAR TESTING DEVICE
Filed Feb. 3, 1941
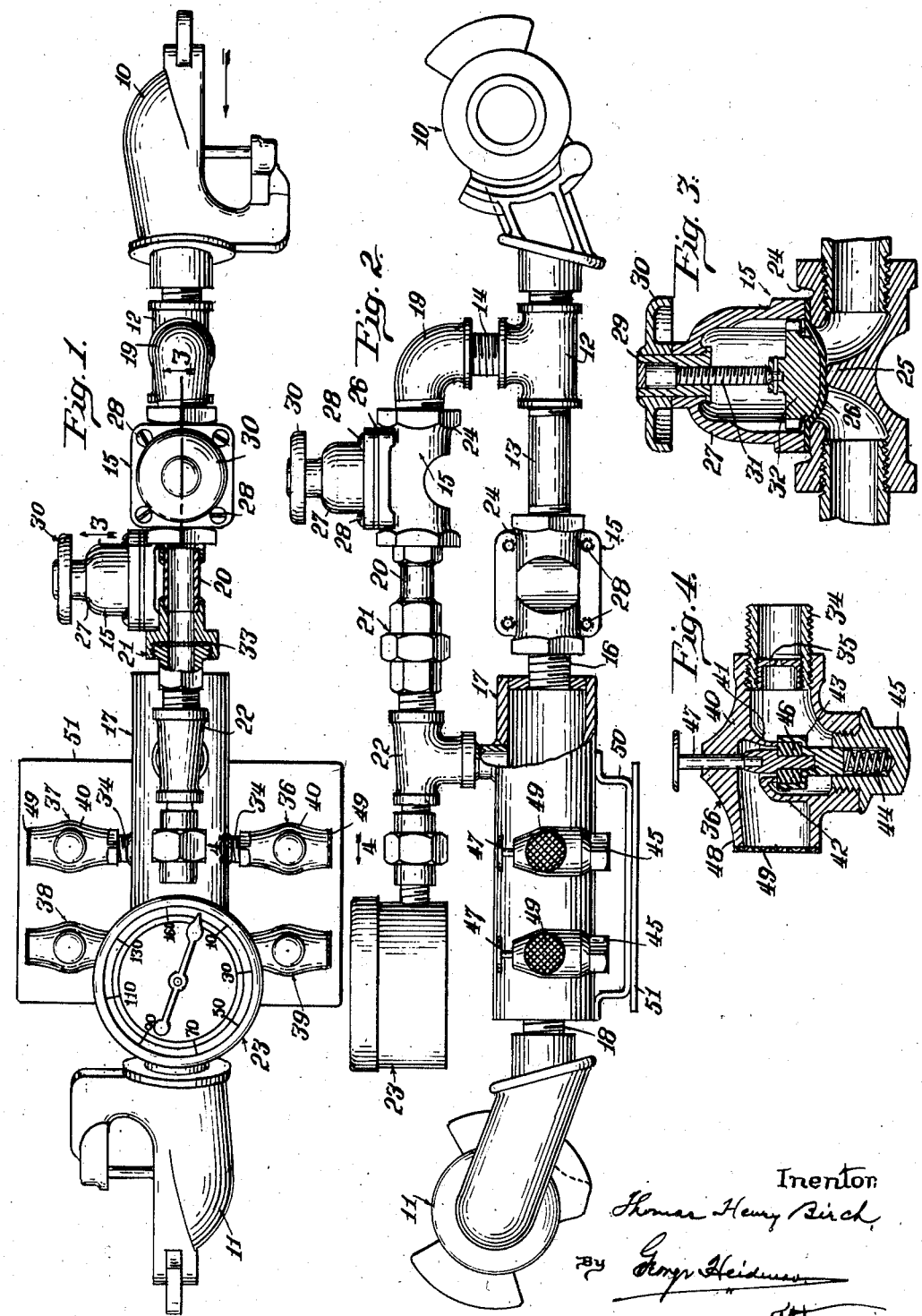
Inventor
Thomas Henry Birch,
By George Heidman
Attorney Patented Apr. 13, 1943

2,316,217

UNITED STATES PATENT OFFICE 2,316,217

SINGLE CAR TESTING DEVICE

Thomas Henry Birch, Wauwatosa, Wis.

Application February 3, 1941, Serial No. 377,200

3 Claims. (Cl. 73—51)

My invention relates to a portable device whereby a general check on the condition and operation of the air brake valve on individual railroad cars may be made, without removing the same from the car, which permits the ability to set the brake with a predetermined rate of reduction in brake pipe pressure and also to release the brake with a predetermined increase in brake pipe pressure.

The invention has for its object the provision of a device which eliminates the difficulties and expense encountered with single car testing devices at present in use and whose construction is such that it is less likely to become defective; a device which may be easily tested for any leaks and in the event of leaks may be quickly repaired at the point of use without need of special skill.

The objects and advantages of my construction will be more readily comprehended from the detailed description of the accompanying drawing wherein—

Figure 1 is a plan view of my improved single car testing device.

Figure 2 illustrates the same in side elevation.

Figure 3 is a detail cross sectional view of one of the diaphragm valves, the view being taken on the line 3—3 in Figure 1.

Figure 4 is a detail cross sectional view of one of the test valves, the view being taken on the line 4—4 of Figure 1.

The invention relates to a device for determining the condition and operation of the air operated brake mechanism and more particularly that of the triple or air brake valve on each individual car while in service and without disconnecting and removing it from the car; namely a device adapted to make the tests of brake application and brake release as required by the codes or rules of the A. A. R. whereby leaks in the mechanism may be disclosed and the operation of the air brake valve ascertained. The existing rules require positive assurance that the air brakes on all railroad cars at all times are in efficient operating condition and therefore demand repeated tests to be made and a part of the means for determining the condition is known as a single car testing device adapted to be connected with the air lines of each individual car; and these tests call for the ability to set the brake with a predetermined rate of reduction in the brake pipe pressure and, likewise, to release the brake with a predetermined increase in brake pipe pressure.

These tests are at present made with a single car testing device which involves a rotary disc valve arranged in close contact with a flat seat, the disc valve and seat being provided with a series of different sized orifices adapted to be successively brought into register in keeping with the nature of test to be made.

In practice it has been found, due to the rotation of the disc valve that the valve or valve-seat becomes scored which frequently results in establishing an air passage connection between various ports, a condition which can only be determined by placing the device on a specially constructed test rack. As a result, car brakes are often tested with a defective device unknown to the operator and a car approved whose air brakes are not in the efficient operating condition required by the rules.

When the defective condition of the rotary valve is discovered it becomes necessary to dismantle the device for repair which usually consists of lapping the rotary valve to its seat. This demands great skill and consumes considerable time. During the repair period a duplicate device must be obtained entailing additional expense and involving a considerable investment of money, inasmuch as the large railroad systems have quite a number of testing points on the railroad where one or more of these devices are employed.

The purpose of my invention is to provide a single car testing device for making a general check on the brake condition of an in-date car, a device which not only is more practicable and less apt to become defective, but also less expensive in construction and maintenance and which also eliminates the great expense of providing a number of the test devices at each testing point on the railroad.

My improved device is so constructed that it functions in the same manner as those at present in use and which can be easily tested for leaks locally at the point of use without need for a specially designed test rack as, however, at present is required. Such racks are located at preselected points on the system but not necessarily at all of the testing points where the single car testing devices are employed and hence the efficiency of the latter cannot always be determined.

My device eliminates the use of the multiported rotary valve of present day devices and involves separate individually operated non-rotating valves for governing the rate of reduction or increase in brake pipe pressure. The particular exemplification of the device illustrated in the drawing consists of the well known type of air line couplers 10 and 11 at each end of the device;

the coupler 10 being intended to couple to a source of compressed air supply or reservoir, while the coupler 11 is coupled to the train line of the car to be tested.

Attached to coupler 10 is a T-fitting or coupling 12 whose one outlet is provided with a nipple 13 and the other outlet with a nipple 14. Nipple 13 leads to a diaphragm valve 15 which in turn is connected by nipple 16 to the cylindrical chamber 17 whose opposite end is connected by nipple 18 to the coupler 11. Nipple 14 of coupling 12 is shown secured to an elbow coupling 19 which is secured to the inlet end of a second diaphragm valve 15 (similar to the first mentioned diaphragm valve) whose outlet, by means of nipple 20, connects with a union 21 which is connected with a T-fitting or coupling 22 which is connected with the air pressure gauge 23 and also with the cylindrical chamber 17 adjacent one end.

The construction of the two diaphragm valves 15 is shown in the sectional view Figure 3 consisting of the main body portion 24 provided with a wall 25, intermediate the inlet and outlet ends, which constitutes a seat for the flexible diaphragm 26 whose peripheral portion is clamped in place by the valve-stem hood portion 27 which is secured to the body portion by screws as at 28. The top of the hood portion is provided with a rotatable and internally threaded sleeve 29 to which hand-wheel 30 is secured; and sleeve 29 controls the externally threaded valve-stem 31 whose lower end has the diaphragm presser block 32 secured thereto; the lower face of the block 32 preferably being somewhat arcuate as shown in Figure 3 and adapted to press the diaphragm 26 to its seat at the top of the wall 25 and thereby shut off the flow of air through the body portion 24 (the valve in Figure 3 being shown in closed position). As is apparent from the drawing, the air coming through coupler 10 may be caused to flow directly into cylindrical member 17 by closing valve 15 at the top of Figure 2; or the air may be made to flow through said top valve 15, T-fitting 22 and thence into cylindrical member 17 by closing the lower valve 15 in Figure 2 which is aligned with cylindrical member 17.

In order to control the flow of compressed air when upper valve 15 is opened, I provide union 21 with a metal disc 33 (see Figure 1) which is centrally provided with a comparatively small hole of predetermined size; the union 21 being preferably soldered to nipple 20 formed of brass; while T-fitting 22 preferably is also soldered or otherwise intimately secured to member 17 against air leakage.

The elongated chambered member 17 at opposite sides is provided with tapped openings (two on each side in the exemplification) to receive the externally threaded nipples 34, whose orifices at one of the ends are shown slightly enlarged and internally threaded to receive the externally threaded ported cup members or chokes 35 as shown in detail in Figure 4 which also illustrates the construction of the valves 36, 37, 38 and 39 which control the four openings in the sides of member 17; the four valves being similar in construction and operation, while each choke 35 is provided with a different sized orifice of predetermined diameter, with the orifice for valve 36 being the smallest.

The valves 36, 37, 38 and 39 each consist of the body portion 40 provided internally with the semi-circular offset walls 41, 42 which provide a seat for the upwardly closing plunger valve 43 which is normally held on its seat and returned to closed position by spring 44 seated in a socket in the plug member 45 which forms a guide for the lower stem of the valve 43; the plug member preferably screwing into the lower threaded opening in the valve body 40 as shown in Figure 4. The valve 43 at the top is preferably cupped to receive a suitable washer as at 46, shown centrally apertured to receive the reduced portion of the hand actuated plunger 47 which slidably extends through the top wall of the body portion 40. The valve in Figure 4 is shown closed, preventing passage of air from member 17, through the outlet end 48 of valve 40 to the atmosphere; the outlet 48 being shown provided with a suitable screen 49 to prevent ingress of foreign matter when the device is not in use. It is apparent that downward pressure on the valve stem 47 will unseat the valve and allow the compressed air to escape to atmosphere through opening 48.

The cylindrical body member 17 is shown provided on its lower side with a bracket 50 to which a transversely disposed plate 51 is secured for the purpose of protecting the valves and also to afford a suitable support for the device.

My improved testing device can be locally tested for leakage at the point of use without a specially designed test rack, as, however, is required with the devices at present in use and which, under the A. A. R. rules must be tested at least once a week. My device may be tested with a pan of water by first placing a dummy coupling or seal on the car end of the device, charging the device with air pressure, then immersing the device in the water at which time any leakage would result in rising air bubbles. The only places where leaks could occur would be at either of the diaphragm valves 15 or at the plunger operated valves 36, 37, 38 and 39, namely at places where the leaks could be easily rectified either by renewal of the rubber diaphragm, which can be accomplished by simply removing the screws whereby the hood portion 27 is secured to the main body of the diaphragm valve 15; or by unscrewing the cap nut 45 of the plunger valves; all of which may be accomplished without in any way disturbing the threaded connections of the device.

When the air brakes are to be tested, the coupling 11 of the device is coupled to the train line and coupling 10 is coupled to an air supply; all valves initially being closed. The diaphragm valve 15 (in line with chamber 17) is then opened and the brake pipe and auxiliary reservoir of the car are charged to required pressure, as for example seventy pounds.

The first test is the application test. Valve 15 (the one in line with chamber 17) is closed and a reduction of brake pipe pressure is accomplished by depressing the plunger of valve 36 until the brake starts to apply at which time the valve 36 is then released.

The second test is a brake pipe leakage test. A further brake pipe reduction is made by using the same valve 36, or valve 38, until a total of fifteen pounds has been obtained and then the valve is again released. It is then possible to determine the amount of brake pipe leakage that may exist in the car.

The next test is the release test which is accomplished by opening diaphragm 15 in the by-pass, at which time the brake should release.

The next test is the service stability test, which is accomplished by closing the valve 15 in the by-pass line and opening valve 15 (in line with cylinder 17) until the brake is again charged to the desired pressure; then close the last mentioned valve 15 and reduce the brake pipe pressure twenty pounds by depressing the plunger of valve 37.

The next test is the emergency test—which is accomplished by depressing the plunger of valve 39 which should produce emergency application.

I have shown what is believed to be the simplest embodiment of my invention which has been described in terms employed for purposes of description and not as terms of limitation, as structural modifications are possible and may be made without, however. departing from the spirit of my invention as defined in the appended claims.

What I claim is:

1. A single car brake testing device comprising a portable unit provided with coupler means for connecting it between a source of air pressure and the car brake pressure line, said unit including a chambered section provided with at least one manually controlled air supply valve and a plurality of manually controlled test valves of different predetermined capacity, the air supply and test valves each being provided with calibrated orifice means of different fluid capacities; and a pressure responsive indicating means in fluid communication with the chambered section, whereby successive manipulation of the test valves will subject the car brake system to different predetermined degrees of fluid pressure, and the indicating means will measure the applied pressures and give evidence of any leakage in the system.

2. A single car air brake testing device comprising a portable unit provided at opposite ends with coupler means for connecting the unit between a source of air pressure and the car brake pressure line, said unit including a chambered member provided with a plurality of manually controlled test valves, each of which is provided with calibrated orifice means of different capacities; a manually controlled supply valve at the inlet end of said chambered member; a by-pass line intermediate said member and the coupler means adapted to be connected with the air pressure source, said by-pass line being provided with a manually controlled valve; and a pressure responsive indicating means in fluid communication with said chambered member, whereby successive manipulation of the test valves will subject the car brake system to different predetermined degrees of fluid pressure, and the indicating means will measure the applied pressures and give evidence of leakage in the system.

3. A single car air brake testing device comprising a portable unit provided at opposite ends with coupler means for connecting the unit between a source of air pressure and the car brake pressure line, said unit consisting of a chambered member provided with a plurality of outlet means which involve plunger-type, self-closing, test valves and calibrated orifice means of different fluid capacities; a manually controlled supply valve in said unit; and a pressure responsive indicating means in fluid communication with the chambered member, whereby successive manipulation of the test valves will subject the car brake system to different predetermined degrees of fluid pressure, and the indicating means will measure the applied pressures and give evidence of any leakage in the system.

THOMAS HENRY BIRCH.